(12) United States Patent
Boehnke

(10) Patent No.: US 10,022,674 B2
(45) Date of Patent: Jul. 17, 2018

(54) FILTER DEVICE

(71) Applicant: OUTOTEC (FINLAND) OY, Epsoo (FI)

(72) Inventor: Bernd Boehnke, Eschweiler (DE)

(73) Assignee: OUTOTEC (FINLAND) OY, Espoo (FI)

( * ) Notice: Subject to any disclaimer, the term of this patent is extended or adjusted under 35 U.S.C. 154(b) by 572 days.

(21) Appl. No.: 14/491,160

(22) Filed: Sep. 19, 2014

(65) Prior Publication Data

US 2015/0060347 A1     Mar. 5, 2015

Related U.S. Application Data

(63) Continuation of application No. PCT/EP2012/054751, filed on Mar. 19, 2012.

(51) Int. Cl.
*B01D 25/12*     (2006.01)
*B01D 63/08*     (2006.01)
(Continued)

(52) U.S. Cl.
CPC ........... *B01D 65/00* (2013.01); *B01D 25/215* (2013.01); *B01D 25/122* (2013.01); *B01D 63/08* (2013.01);
(Continued)

(58) Field of Classification Search
CPC ...... B01D 25/12; B01D 25/21; B01D 25/122; B01D 25/127; B01D 25/16; B01D 25/164; B01D 25/176; B01D 25/18; B01D 25/215; B01D 2313/025; B01D 2313/08; B01D 2313/20; B01D 63/08; B01D 63/081; B01D 63/082; B01D 63/084; B01D 63/085; B01D 25/285; B01D 25/19; B01D 25/1275; B01D 25/302
(Continued)

(56) References Cited

U.S. PATENT DOCUMENTS 3,988,242 A * 10/1976 Kurita ................. B01D 25/215
                                               210/227
4,900,436 A * 2/1990 Iwatani ................ B01D 25/215
                                               100/198
(Continued)

FOREIGN PATENT DOCUMENTS

DE         1461450 A1    1/1969
DE         10304004        4/2004
DE      202005006535 U1   8/2006

*Primary Examiner* — Pranav N Patel
(74) *Attorney, Agent, or Firm* — Von Rohrshiedt Patents

(57) ABSTRACT

A filter device including a stationary head piece and a movable end piece and a pack of adjacent elements including a recess plate, wherein the pack is arranged between the stationary head piece and the movable end piece, wherein the recess plate includes a base element including a recess forming a filter chamber between the adjacent elements, wherein the filter device includes a filter membrane between the adjacent elements, wherein the filter membrane retains a solid content of a suspension as a filter cake and allows a remaining liquid fraction of the suspension to pass as a filtrate, wherein the recess plate includes a fluid pipe discharging the filtrate, which fluid pipe runs along a narrow edge of the base element, wherein the recess plate includes a fluid duct that connects the fluid pipe to the filter chamber.

15 Claims, 5 Drawing Sheets

(51) Int. Cl.
 *B01D 65/00* (2006.01)
 *B01D 25/21* (2006.01)

(52) U.S. Cl.
 CPC ........ *B01D 63/082* (2013.01); *B01D 2313/08* (2013.01); *B01D 2313/20* (2013.01)

(58) Field of Classification Search
 USPC .................... 210/224–231, 331, 346, 486
 See application file for complete search history.

(56) References Cited

U.S. PATENT DOCUMENTS

| | | | | |
|---|---|---|---|---|
| 6,180,002 B1* | 1/2001 | Higgins | ............... | B01D 25/215 100/211 |
| 6,365,043 B1* | 4/2002 | Haberle | ............... | B01D 25/215 210/231 |
| 2008/0087595 A1* | 4/2008 | Hermann | ............. | B01D 25/215 210/231 |

* cited by examiner

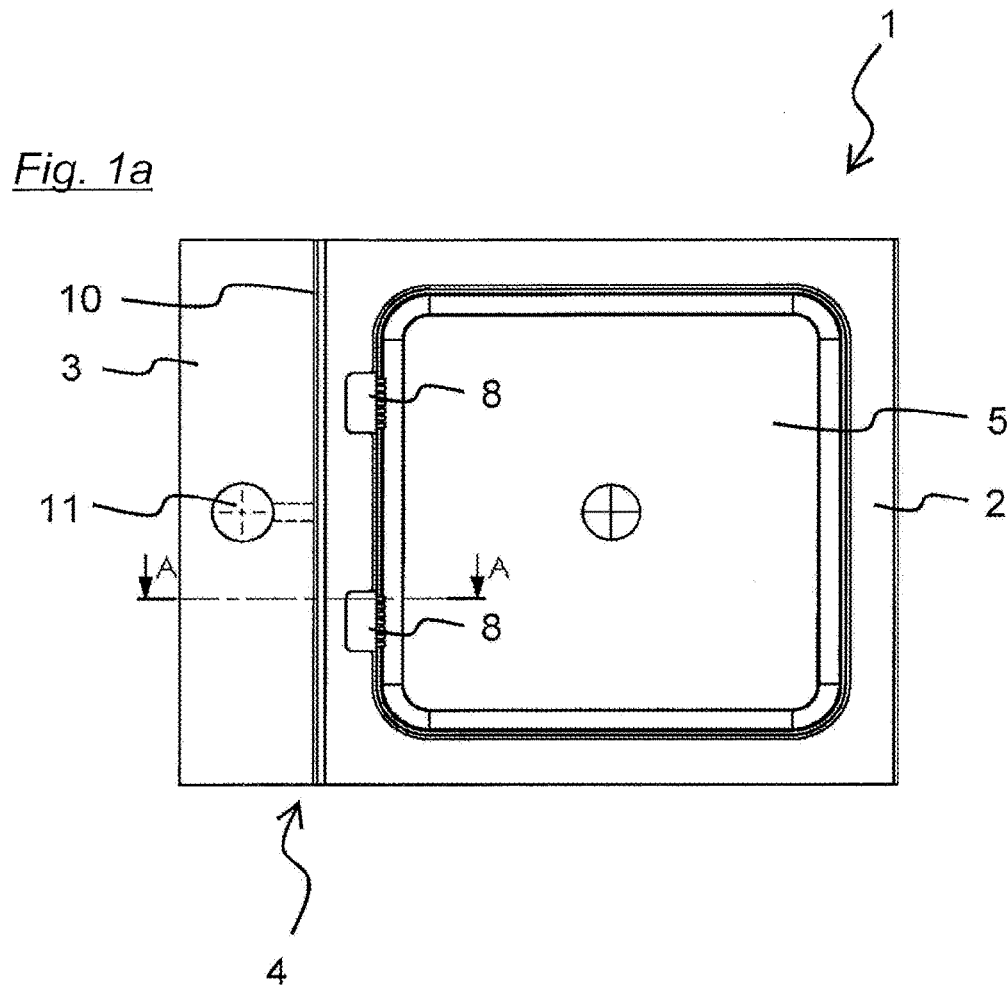
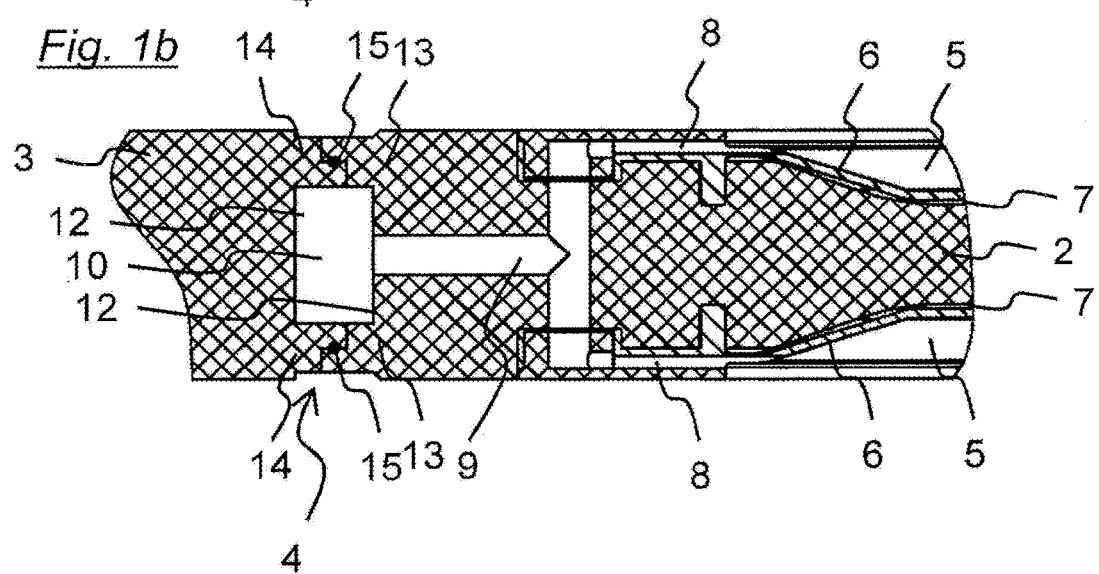

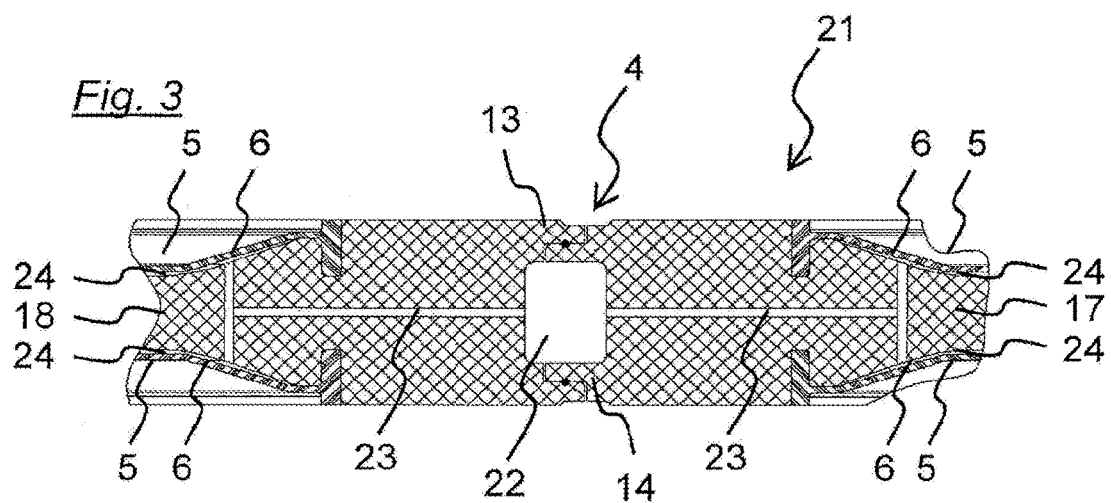
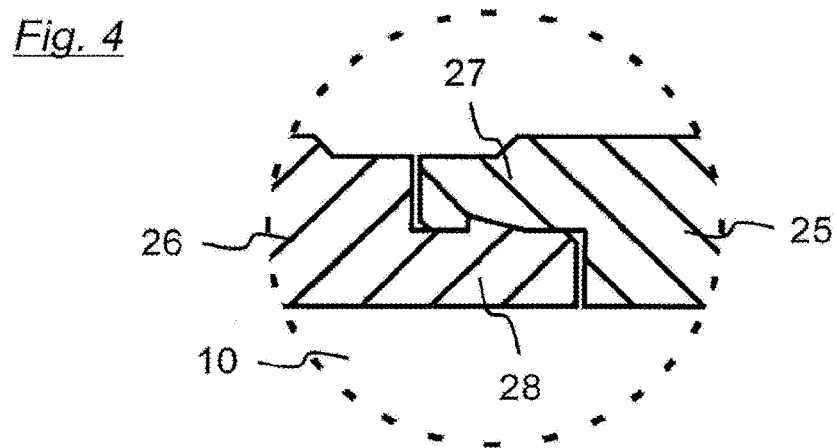
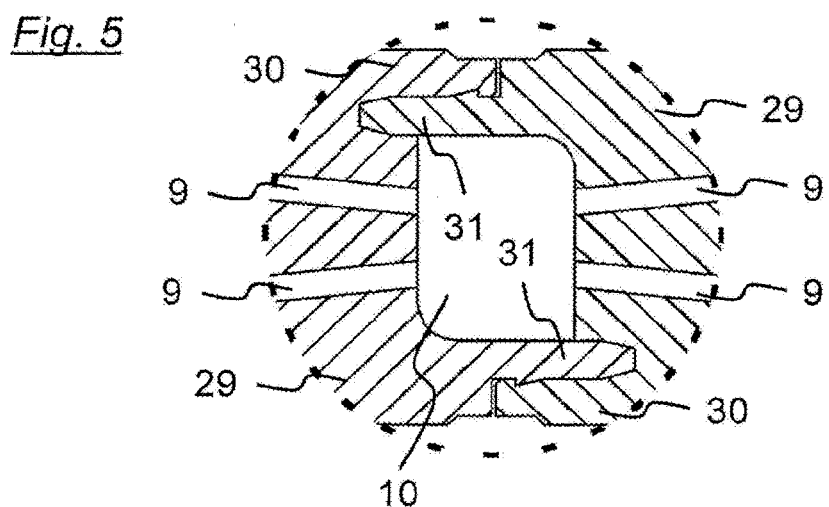

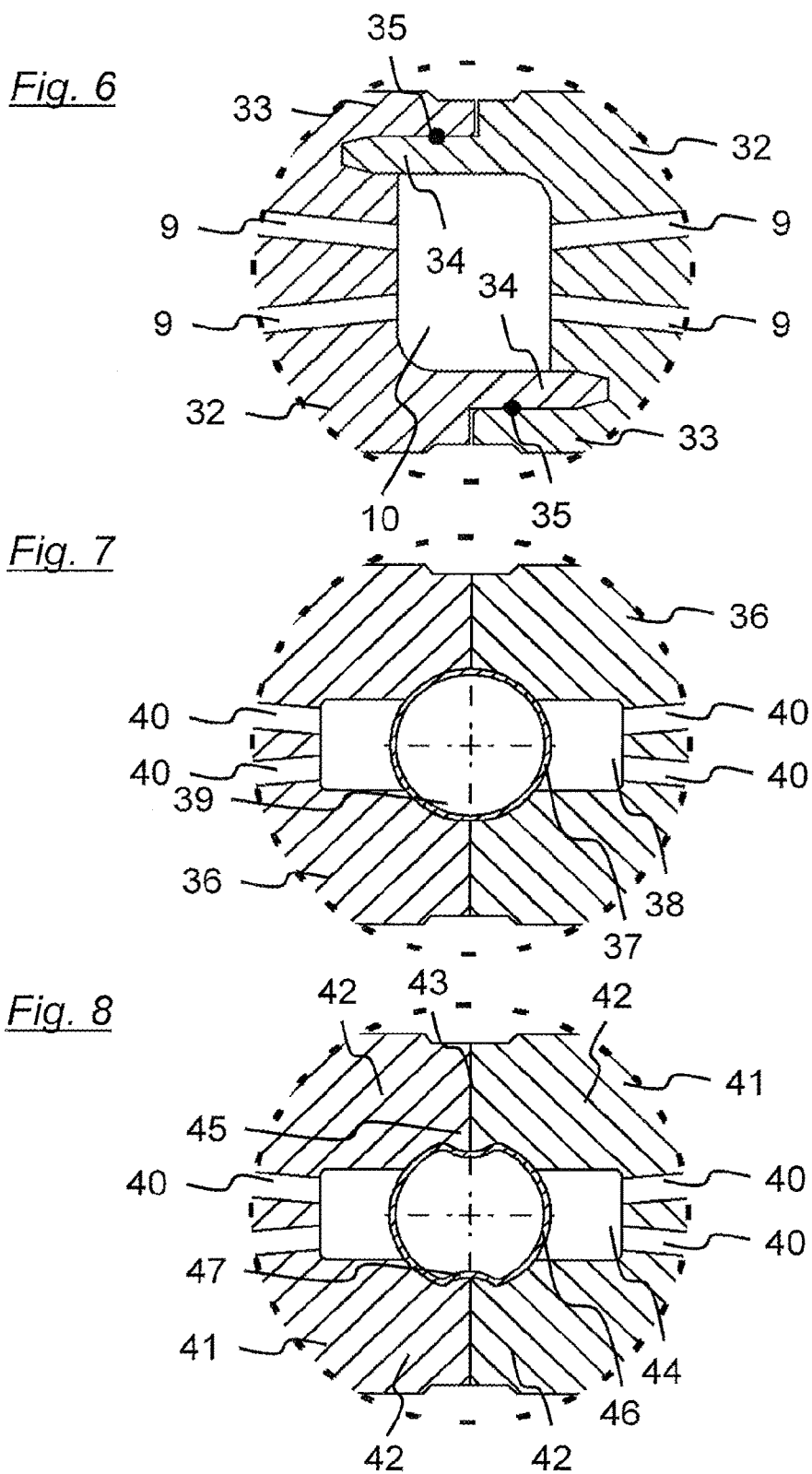

FILTER DEVICE

RELATED APPLICATIONS

This application is a continuation of International patent application PCT/DE2012/054751 filed on Mar. 19, 2012 which is incorporated in its entirety by this reference.

FIELD OF THE INVENTION

The invention relates to a recess plate.

BACKGROUND OF THE INVENTION

Recess plate are known in the art, inter alia from DE 103 04 004. Furthermore, JVK Filtration Systems GmbH/Germany, supplier of recess plates, is known to have combined two base elements of size 1200×1200 mm and installed the same to a large filter device.

The known recess plates, in particular made of polypropylene, allow for building a filter device that exceeds production dimensions of a common injection molding process, and the dimensions of common transportation facilities. In the known recess plates, the extension that is connected to the base element is a second base element, both base elements comprising respective recesses and fluid ducts for piping the suspension into the respective filtrate chambers, and the filtrate out of the same. The known recess plates use support frames for supporting the base elements and keeping the base elements in position.

Further commonly known recess plates comprise fluid pipes for several fluids, in particular for the suspension, for the filtrate, for a washing liquid, for a drying gas, and for a squeezing fluid, the fluid pipes distributing the respective fluid along a narrow edge of the base element to several inlets into the respective filter chamber, or collecting it from several outlets out of the filter chamber. Within the known recess plates, these fluid pipes either are formed inside the base element, or inside the extension, or externally flanged to the recess plate.

Where overall dimensions of a filter device are commonly restricted, both the support frames, the respective connecting device between the base element and the extension, and the fluid pipes of the known recess plates require space, thus reducing the potential remaining effective filter surface of the recess plate.

BRIEF SUMMARY OF THE INVENTION

It is an object of the invention to enlarge an effective filter surface of a recess plate. Improving upon the known filter device, it is suggested according to the invention that the fluid pipe runs between the base element and the extension.

The object is achieved by a filter device including a stationary head piece and a movable end piece a pack of adjacent elements including a recess plate, wherein the pack is arranged between the stationary head piece and the movable end piece, wherein the recess plate includes a base element including a recess forming a filter chamber between the adjacent elements, wherein the filter device includes a filter membrane between the adjacent elements, wherein the filter membrane retains a solid content of a suspension as a filter cake and allows a remaining liquid fraction of the suspension to pass as a filtrate, wherein the recess plate includes a fluid pipe discharging the filtrate, which fluid pipe runs along a narrow edge of the base element, wherein the recess plate includes a fluid duct that connects the fluid pipe to the filter chamber, wherein the recess plate includes an extension that is connected to the narrow edge of the base element, and wherein the fluid pipe extends between the base element and the extension.

Forming a fluid duct between the base element and the extension reduces the space required inside the base element or inside the extension, and thus enlarges the possible effective filter surface of the recess plate.

In a filter device according to the invention, the extension may be a second base element, having a second fluid duct that connects the fluid pipe to a second filter chamber. The effective filter surface of such recess plate is larger than the respective value of one single base element. A filter device according to the invention may further have extensions on more than one narrow edge of the base element, and more than one extension may be further base elements. In particular, a recess plate of a filter device according to the invention may comprise three base elements in line, or four base elements arranged in tiles.

Advantageously, in a filter device according to the invention, the extension is clipped to the base element. Connecting the extension to the base element thus requires no-external means, or at least reduces the demand for externally connecting force. Clipping may be performed by forming clipping means directly to the base element and/or to the extension, or by separate clipping means either inside the fluid duct, or gripping the narrow edge of the base element and/or of the extension.

Further advantageously, a filter device according to the invention has a support, running along the fluid pipe that supports the recess plate. Stiffness of such recess plate is easily increased.

Such filter device according to the invention advantageously has a cavity inside the support for piping the fluid. The support being a pipe inserted into the fluid pipe, and piping the fluid, reduces the risk of leakage of the fluid out of the fluid pipe.

Furthermore, in such filter device according to the invention, the support is clipped to the base element and/or to the extension. Clipping the support into the base element or into the extension simplifies assembling the recess plate.

In a pack of a filter device according to the invention, the recess plates are vertically stacked on top of each other or hanging side by side. The filter device is secured by hydraulic force, by the weight of the stacked recess plates and/or by mechanical means. Each filter chamber is equipped with at least one filter cloth, but may be equipped with two filter cloths, where in the first case the suspension is piped into the recess of one recess plate and permeates the filter cloth to the other, and in the latter case filled in between the filter cloths and permeating to both adjacent recess plates. In such filter device, recesses may have movable membranes, the membranes and the respective recesses enclosing a squeezing chamber that may be loaded with a squeezing fluid for mechanically pressing the remaining filter cake. In such filter device according to the invention, recess plates are made of plastics, e.g. polypropylene (PP), or of metal, e.g. aluminum or steel.

Further in such filter device according to the invention, the filter chamber may be formed by two adjacent recesses, or by one single recess adjoining to a face of a recess plate, with no recess. Furthermore, the pack may contain a sequence of identical recess plates, in unchanging orientation, a sequence of identical recess plates, in changing orientation or a sequence of alternating recess plates according to the invention. Accordingly, recess plates of a filter device according to the invention may have two recesses, one recess or even no recess at all.

BRIEF DESCRIPTION OF THE DRAWINGS

The method according to the invention and the associated recess plate and filter device are subsequently described in more detail with reference to advantageous embodiments, illustrated in the drawing Figures, wherein:

FIG. 1a illustrates a front view of a first recess plate;

FIG. 1b illustrates a detail cut through this first recess plate;

FIG. 3 illustrates a detail cut through a third recess plate;

FIG. 4 illustrates a detail of a cut through a fourth recess plate;

FIG. 5 illustrates a detail of a cut through a fifth recess plate;

FIG. 6 illustrates a detail of a cut through a sixth recess plate;

FIG. 7 illustrates a detail of a cut through a seventh recess plate;

FIG. 8 illustrates a detail of a cut through a eighth recess plate; and

DETAILED DESCRIPTION OF THE INVENTION

Figure 2A:
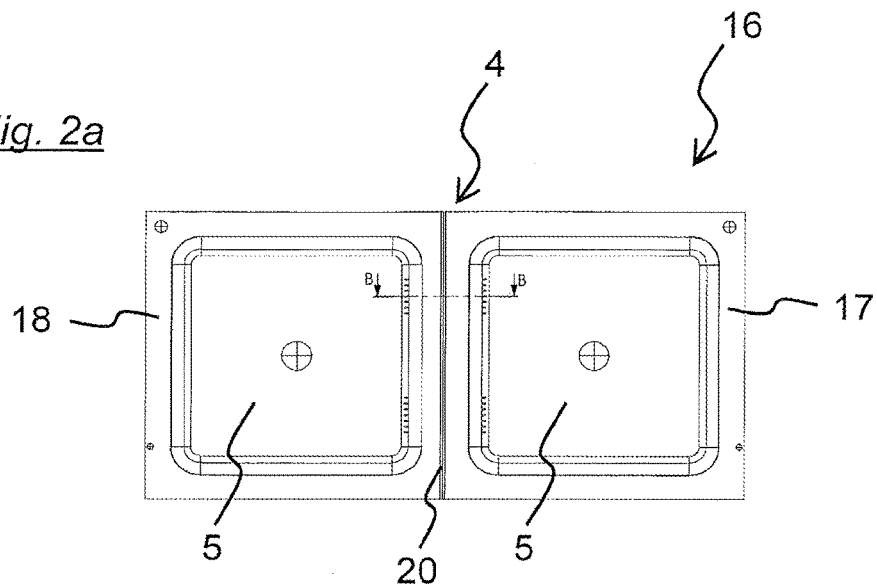
FIG. 2a illustrates a front view of a second recess plate.

The first recess plate 1 of a filter device according to the invention illustrated in FIGS. 1a and 1b has a base element 2 and an extension 3 that is connected to a vertical narrow edge 4 of the base element 2. The first recess plate 1 is part of a first filter device, having a stationary head piece and a movable end piece, and a pack, of first recess plates 1 and other recess plates. In the pack, the first recess plates 1 and other recess plates are hanging side by side in an alternating sequence. The filter device is secured by hydraulic force. Each filter chamber is equipped with two filter cloths, where the suspension is filled in between the filter cloths and permeating to both adjacent recess plates 1. The first recess plates 1 and the other recess plates are made of polypropylene.

Figure 9:
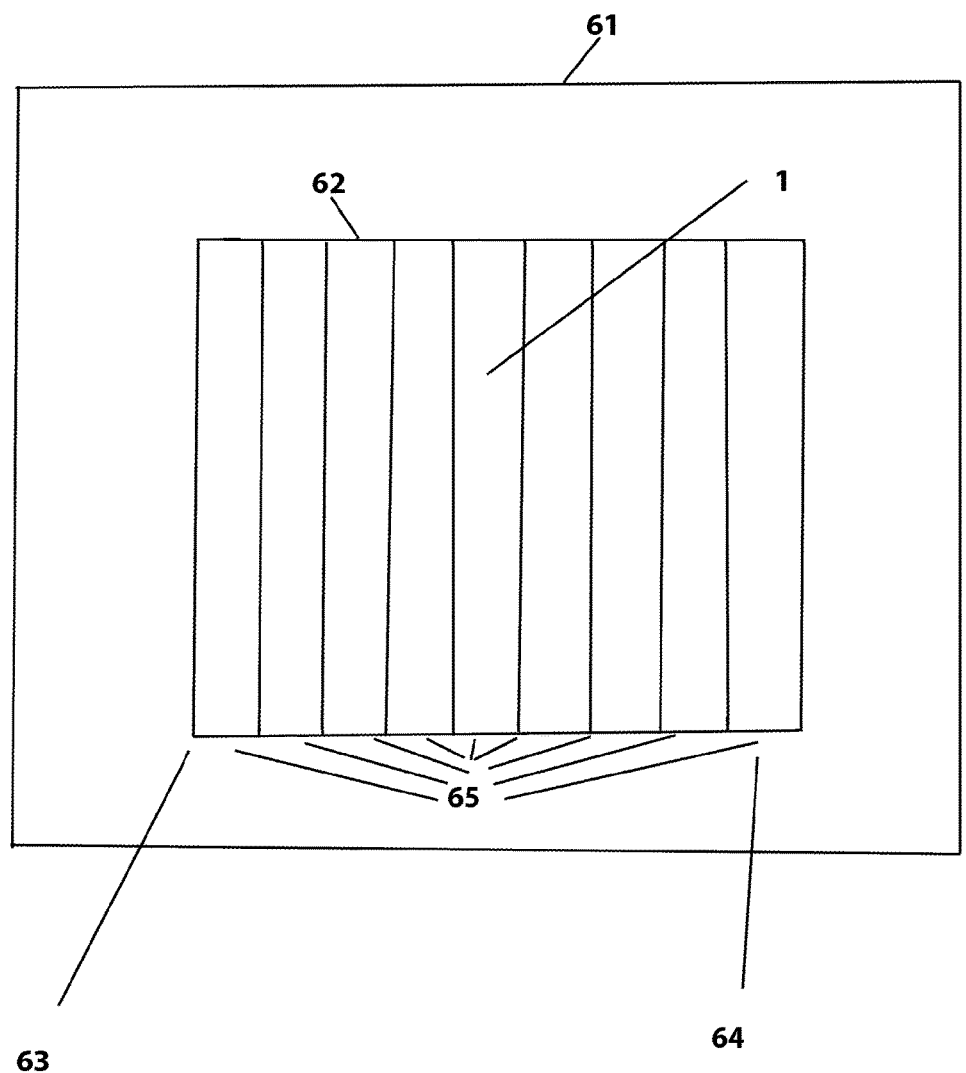
FIG. 9 illustrates a block diagram of the filter device according to the invention with the recess plate

FIG. 9 illustrates the filter device 61 with the recess plate 1 included in the pack 62 including adjacent elements 65, wherein the pack is supported in the filter device between a stationary head piece 63 and a movable end piece 64.

The base element 2 of the first recess plate 1 has recesses 5 on the front face, and on the back face. The first recess plate 1—a so called "membrane plate"—has a movable membrane 6, attached to each of the recesses 5. The membranes 6 and the respective recesses 5 enclose two squeezing chambers 7 that may be loaded with a squeezing fluid for mechanically pressing the remaining filter cake. The other recess plate (not illustrated)—a so called "chamber plate"—of the first filter device is basically similar to the first recess plate 1, but has no membranes attached to the recesses 5.

Attached to the base element 2, the first recess plate 1 has two filtrate shoes for discharging the filtrate from the filter chamber into a fluid duct 9 that opens into a fluid pipe 10 running along the narrow edge 4 between the base element 2 and the extension 3. The fluid pipe 10 connects to a filtrate drain 11 in the extension 3 that runs through the pack, back to the head piece.

Both the base element 2 and the extension 3 have recesses 12 running along the narrow edge 4 that form the fluid pipe 10. The base element 2 has outer check rails 13 that protrude from the narrow edge 4. The extension 3 has corresponding inner profiles 14, that protrude towards the base element 2, and that fit between the check rails 13 of the base element 2. Two sealing elements 15 are clamped between the check rails 13 and the corresponding profiles 14, sealing the fluid pipe 10 from the ambience of the first recess plate 1. The base element 2 and the extension 3 of the first recess plate 1 are clipped together by means of the sealing elements 15 and connected by an external frame (not illustrated).

Figure 2B:
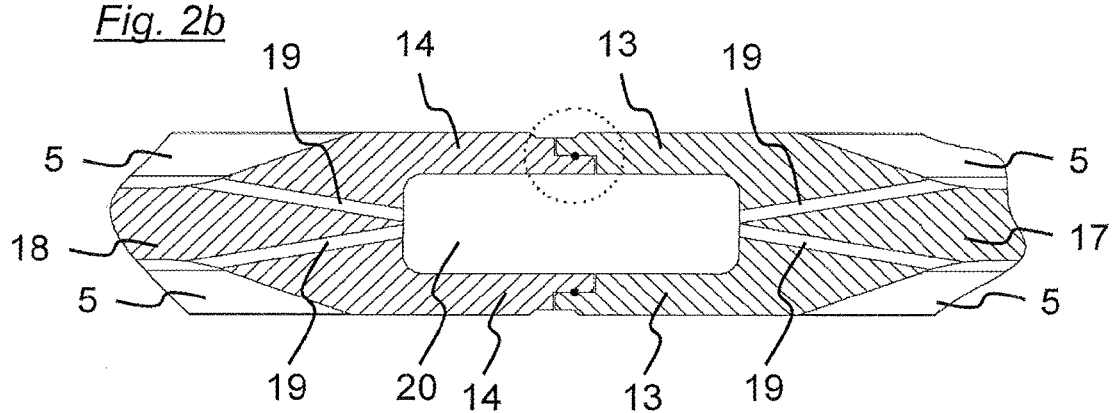
FIG. 2b illustrates a detail cut through this second recess plate.
Figure 2C:
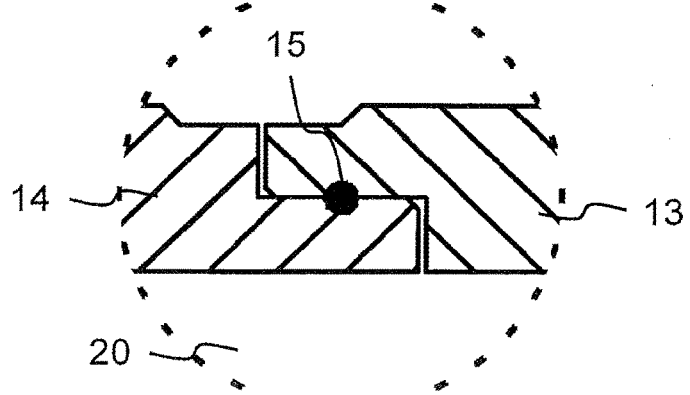
FIG. 2c illustrates a detail of this cut.

The second recess plate 16 of the filter device according to the invention illustrated in FIGS. 2a, 2b and 2c has a first base element 17 and (as an extension) a second base element 18. Apart from different geometries the second recess plate 16 is part of a second filter device that resembles the first filter device mentioned above, and the base elements 17, 18 of the second recess plate 16 resemble the base element 2 of the first recess plate 1.

Apart from the second recess plate 16, the second filter device and its further parts are not illustrated. Basically identical features of the second recess plate 16 and its base elements 17, 18 are marked according to the first recess plate 1.

The base elements of the second recess plate 16 each have two fluid ducts 19 for discharging the filtrate from the respective recesses into a common fluid pipe 20 between the base elements. From the fluid pipe 20, the filtrate is discharged to the ambient, and to a collecting hutch (not illustrated) underneath the second recess plate 16.

The third recess plate 21 of a filter device according to the invention, illustrated in FIG. 3, is part of the second filter device, basically resembles the second recess plate 16, and forms the pack in an alternating sequence with the second filter plate. Whereas the second recess plate 16 is a so-called "chamber plate", having no membranes, the third recess plate 21 is a so-called "membrane plate". The fluid pipe 22 of the third recess plate 21 connects to fluid ducts 23 for distributing a squeezing fluid into the respective squeezing chambers 24.

FIG. 4 illustrates a detail of an alternative geometry for connecting the base element 25 and the extension 26 of a fourth recess plate that is basically similar to the first recess plate 1, but not illustrated further. The check rails 27 of the base element 25 and the profiles 28 of the extension 26 both are barbed and interlock when assembling the fourth recess plate.

FIG. 5 illustrates a detail of a further alternative geometry for connecting two identical base elements 29 of a fifth recess plate, that are basically similar to the base element 25 of the fourth recess plate, but further not illustrated. Each base element 29 has a barbed check rail 30 corresponding to a barbed profile 31 of the respective other base element 29.

FIG. 6 illustrates a detail of a further alternative geometry for connecting two identical base elements 32 of a sixth recess plate, that is basically similar to the fifth recess plate, but further not illustrated. The check rails 33 and the profiles 34 of the sixth recess plate are not barbed. The sixth recess plate has two sealing elements 35 between the corresponding check rails and profiles. The base elements of the sixth recess plate are clipped together by means of the sealing elements 15 and connected by an external frame (not illustrated).

FIG. 7 illustrates a detail of a further alternative geometry for connecting two identical base elements 36 of a seventh recess plate, that resembles the second recess plate 16, but is further not illustrated. The seventh recess plate has a support 37 that runs along the fluid pipe 38. The support 37 is a pipe and has a cavity 39 for piping the fluid into or collecting the fluid from the fluid ducts 40. The base elements of the seventh recess plate are connected by an external frame (not illustrated).

FIG. 8 illustrates a detail of a further alternative geometry for connecting two identical base elements 41 of an eighth recess plate that resembles the seventh recess plate, but is not illustrated further. The base elements have profiles 42 that run along the narrow edge 43 and enclose the fluid pipe 44 and edges 45 protruding from the profiles 42 towards the support 46. The support 46 has two recesses 47 that clip between the edges 45, thus fixating the base elements 41 together.

REFERENCE NUMERALS AND DESIGNATIONS 1 recess plate
2 base element
3 extension
4 edge
5 recess
6 membrane
7 squeezing chamber
8 filtrate shoe
9 fluid duct
10 fluid pipe
11 filtrate drain
12 recess
13 check rail
14 profile
15 sealing element
16 recess plate
17 base element
18 base element
19 fluid duct
20 fluid pipe
21 recess plate
22 fluid pipe
23 fluid duct
24 squeezing chamber
25 base element
26 extension
27 check rail
28 profile
29 base element
30 check rail
61 filter device
62 pack
63 stationary head piece
64 movable end piece
65 adjacent elements

What is claimed is:

1. A filter device, comprising:
a stationary head piece;
a movable end piece; and
a pack of adjacent elements including a recess plate,
wherein the pack is arranged between the stationary head piece and the movable end piece,
wherein the recess plate includes a base element including a recess forming a filter chamber between the adjacent elements,
wherein the filter device includes a filter membrane between the adjacent elements,
wherein the filter membrane retains a solid content of a suspension as a filter cake and allows a remaining liquid fraction of the suspension to pass as a filtrate,
wherein the recess plate includes a fluid pipe discharging the filtrate,
wherein the fluid pipe runs along a narrow edge of the base element and the narrow edge is parallel to the recess plate,
wherein the recess plate includes a fluid duct that connects the fluid pipe to the filter chamber,
wherein the recess plate includes an extension that is connected to the narrow edge of the base element,
wherein the fluid pipe runs between the base element and the extension, and
wherein the base element and the extension are separate components assembled together.

2. The filter device according to claim 1, wherein the extension is a second base element including a second fluid duct that connects the fluid pipe to a second filter chamber.

3. The filter device according to claim 1, wherein the extension is clipped to the base element.

4. The filter device according to claim 1, further comprising a support running along the fluid pipe and supporting the recess plate.

5. The filter device according to claim 4, further comprising a cavity inside the support for piping the fluid.

6. The filter device according to claim 5, wherein the support is clipped to the base element or to the extension.

7. The filter device according to claim 5, wherein the support is clipped to the base element and to the extension.

8. The filter device according to claim 1, wherein the narrow edge is a vertical narrow edge.

9. The filter device according to claim 1, wherein the fluid pipe is enveloped by the base element and the extension.

10. The filter device according to claim 1, wherein the pack of adjacent elements is vertically stacked on top of each other or hanging side by side.

11. The filter device according to claim 10, wherein the pack of adjacent elements is hanging side by side.

12. The filter device according to claim 11, wherein the narrow edge is a vertical narrow edge.

13. The filter device according to claim 1, wherein the base element includes check rails that are barbed and interlock, and the extension includes profiles that are barbed and interlock.

14. The filter device according to claim 1, wherein the recess plate includes three edges other than the narrow edge and the fluid pipe is absent from the three edges.

15. The filter device according to claim 1, wherein the recess plate includes three edges other than the narrow edge and the extension is absent from the three edges.

* * * * *